(12) United States Patent
Mace et al.

(10) Patent No.: US 7,733,910 B2
(45) Date of Patent: Jun. 8, 2010

(54) DATA SEGMENTATION USING SHIFT-VARYING PREDICATE FUNCTION FINGERPRINTING

(75) Inventors: James E. Mace, San Francisco, CA (US); David B. Anderson, San Francisco, CA (US); Steven McCanne, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 619 days.

(21) Appl. No.: 11/618,190

(22) Filed: Dec. 29, 2006

(65) Prior Publication Data
US 2008/0159331 A1    Jul. 3, 2008

(51) Int. Cl.
*H04L 12/56* (2006.01)
(52) U.S. Cl. .................................................. 370/473
(58) Field of Classification Search ................. None
See application file for complete search history.

(56) References Cited

U.S. PATENT DOCUMENTS

| | | | |
|---|---|---|---|
| 4,641,274 A | 2/1987 | Swank | |
| 5,754,774 A | 5/1998 | Bittinger et al. | |
| 5,990,810 A | 11/1999 | Williams | |
| 6,076,084 A | 6/2000 | Harlan | |
| 6,163,811 A | 12/2000 | Porter | |
| 6,178,461 B1 | 1/2001 | Chan et al. | |
| 6,415,329 B1 | 7/2002 | Gelman et al. | |
| 6,704,730 B2 | 3/2004 | Moulton et al. | |
| 6,828,925 B2 | 12/2004 | McCanne et al. | |
| 6,856,651 B2 | 2/2005 | Singh | |
| 6,883,035 B2 | 4/2005 | Hannu et al. | |
| 6,961,009 B2 | 11/2005 | McCanne et al. | |
| 7,098,815 B1 | 8/2006 | Samuels et al. | |
| 7,116,249 B2 | 10/2006 | McCanne et al. | |
| 7,269,689 B2 * | 9/2007 | Eshghi et al. | ............... 711/112 |
| 7,272,602 B2 | 9/2007 | Moulton | |
| 7,281,006 B2 * | 10/2007 | Hsu et al. | ...................... 707/6 |
| 7,370,120 B2 | 5/2008 | Kirsch et al. | |
| 2004/0215746 A1 | 10/2004 | McCanne et al. | |

OTHER PUBLICATIONS

Hsu et al, Duplicate Management for Reference Data, IBM Research Report, 15 pages, Oct. 2003.*
Collberg et al, SLINKY: Static Linking Reloaded, USENIX Annual Technical Conference, 14 pages, 2005.*

(Continued)

*Primary Examiner*—Frank Duong
(74) *Attorney, Agent, or Firm*—Townsend and Townsend and Crew LLP

(57) ABSTRACT

Shift-varying segmentation uses a shift-varying predicate function to evaluate input data within a sliding window to determine if the current sliding window position should be a segment boundary. The shift-varying predicate function is a function of both the input data within the sliding window and the position of the sliding window relative to a previous segment boundary or the beginning of the input data. The shift-varying predicate function includes a containment property and may compute a hash value from the input data in the sliding window. The hash value is compared to a threshold value that is a function of the sliding window position. As the sliding window position advances away from a previous segment boundary, the probability of a segment boundary at the window position increases. Shift-varying segmentation can be used in compression, transaction acceleration, and data storage applications.

56 Claims, 5 Drawing Sheets

OTHER PUBLICATIONS

Broder, A.Z. et al.; "Syntactic clustering of the web"; WWW6/Computer Networks, 29(813) :1157-1166, 1997.

Chakrabarti,, Samidh; "Low-Bandwidth Web Access with Tandem Proxies" Sep. 2002; 1-64; Massachusetts Institute of Technology.

Douglis, Fred, et al., "Application-specific Delta-encoding via Resemblance Detection", Jun. 2003, Proceedings of the 2003 USENIX Annual Technical Conference.

Manber, Udi et al., "A Text Compression Scheme That Allows Fast Searching Directly in the Compressed File", Department of Computer Science, Mar. 1993, pp. 1-12, Technical Report #93-07, University of Arizona, Tucson, Arizona.

Manber, Udi et al., "Finding Similar Files in a Large File System", Department of Computer Science, Oct. 1993, pp. 1-10, Technical Report #93-33, University of Arizona, Tucson, Arizona.

Manber, Udi et al., "Glimpse: A Tool to Search Through Entire File Systems", Department of Computer Science, Oct. 1993, pp. 1-10, Technical Report #93-94, University of Arizona, Tucson, Arizona.

Muthitacharoen, Athicha et al., "A Low-bandwidth Network File System", Symposium on Operating Systems Principles, 2001, pp. 147-187.

Rabin, M. O. "Fingerprinting by random polynomials"; Center for Research in Computing Technology, Harvard University, Report TR-15-81, 1981.

Spring, Neil T. et al., "A Protocol-Independent Technique for Eliminating Redundant Network Traffic", Aug. 2000, Proceedings of ACM SIGCOMM.

Tolia, Niraj, et al.,; "Opportunistic Use of Content Addressable Storage for Distributed File Systems"; Jun. 2003, Proceedings of the 2003 USENIX Annual Technical Conference.

Tolia, Niraj et al., "An Architecture for Internet Data Transfer", Third Symposium on Networked Systems Design and Implementation, May 2006.

Factor, Michael et al., "Compression in the Presence of Shared Data," Jun. 2001, Information Sciences: An International Journal, vol. 135, Issue 1-2, pp. 29-41.

Feldmeier, D.C. et al., "Protocol Boosters," Apr. 1998, IEEE, pp. 1-14.

Housel, B.C. et al., "Emulator Express: A System for Optimizing Emulator Performance for Wireless Networks," 2000, IBM Systems Journal, vol. 39, No. 2, pp. 384-402.

Johnson, J.H., "Identifying Redundancy in Source Code Using Fingerprints," Oct. 25-28, 1993, Proceedings of CAS CON '93, Toronto, Ontario, Canada, pp. 171-183.

Purushottam, Kulkarni, et al., "Redundancy Elimination Within Large Collections of Files," Jun. 27-Jul. 2, 2004, Proceedings of the General Track: 2004 USENIX Annual Technical Conference, University of Massachusetts, Boston, Massachusetts, 14 pages total.

Rhea, Sean C. et al., "Value-Based Web Caching," May 2003, *Proceedings of the 12th International Conference on World Wide Web*, Budapest, Hungary, pp. 619-628.

* cited by examiner

DATA SEGMENTATION USING SHIFT-VARYING PREDICATE FUNCTION FINGERPRINTING

CROSS-REFERENCES TO RELATED APPLICATIONS

This application is related to U.S. Pat. Nos. 6,828,925 and 6,961,009, both of which are incorporated by reference herein for all purposes.

BACKGROUND OF THE INVENTION

The present invention relates to the area of segmenting data for the purposes of data communications, storage, search, and compression. Many applications use data segmentation to process data. Data segmentation breaks a large or continuous stream of data into multiple smaller data segments. The application then processes each segment to perform the desired function.

For example, packet based data networks communicate data in discrete packets. Typically, there is a maximum limit on the size of each packet. A network communications application can use data segmentation to break a large amount of data or a continuous stream of data into packet size segments. In a further example, a network protocol acceleration application can segment a large amount of data or a continuous stream of data into segments to exploit the similarity between different segments. The network protocol acceleration application then uses data suppression and/or compression techniques to minimize the amount of data sent over a network connection and/or to minimize actual or apparent network latency.

There are many prior data segmentation techniques. Prior data segmentation techniques segment data according to a shift-invariant, deterministic predicate function applied to a fixed window of the input at each offset of the buffer. A sliding window of fixed size is moved over data in a buffer. A predicate function, or set of rules, is applied to the data within the window at each window position. The predicate function can be constructed to output a true or false value based on its input data. If the predicate function evaluates to false for a given window position, the sliding window is moved to the next window position. If the predicate function evaluates to true for the data within the window at a given window position, a segmentation boundary is selected based on the current window position. By evaluating all of the buffer data for all possible window positions, a set of segmentation boundaries for the buffer data is created. The buffer data between adjacent segmentation boundaries form a segment.

Prior segmentation techniques utilize deterministic, shift-invariant predicate function. This type of predicate function outputs the same value for a given set of data, regardless of the position of the window within the buffer. For example, a shift-invariant predicate function will output the same value for a given set of data regardless of whether this data is located at the beginning of the buffer, in the middle of the buffer, or at the end of the buffer.

One advantage of a shift invariant predicate function is that the same data is segmented in the same fashion regardless of how or where it is encountered, e.g., whether it is in a file in a file system, a packet in a network, a row in a database, a transport buffer in a TCP connection, and so forth.

However, shift invariant predicate functions also have many disadvantages. One disadvantage of shift-invariant predicate functions is that certain data inputs will not generate any segment boundaries. This can occur when the predicate function evaluates a particular byte pattern as false (meaning there is no segment boundary chosen) and that byte pattern appears continuously in the input buffer.

To overcome this problem, prior segmentation systems impose an upper bound on a segment length. If the distance between the last segment boundary detected and the current position of the sliding window of the predicate function exceeds the upper bound on segment length, a segment boundary is created regardless of the output of the predicate function. Thus, the maximum segment length in these prior segmentation systems is the value of this upper bound.

A further problem with shift-invariant segmentation processes is that they tend to produce segments whose sizes are distributed in a skewed fashion. That is, the segment sizes tend to vary significantly rather than being clustered near a common value. This, in turn can create inefficiencies for implementations that utilize segments because such a system must accommodate a wide range of size rather than being tuned or optimized for a narrow range of sizes.

It is therefore desirable for a system and method of data segmentation overcome the disadvantages of prior data segmentation schemes and provide improved identification of redundant data for typical data inputs and improved distribution of segment sizes for more efficient communications and storage. It is also desirable for the system and method of data segmentation to be adaptable to a variety of different data communications, compression, and storage applications.

BRIEF SUMMARY OF THE INVENTION

An embodiment of the invention uses shift-varying segmentation to segment data. A shift-varying predicate function evaluates input data within a sliding window and outputs a true value to specify a segment boundary at the current sliding window position. If the shift-varying predicate function outputs a false value, the sliding window position is advanced to a new position. The shift-varying predicate function is a function of both the input data within the sliding window and the position of the sliding window relative to a previous segment boundary or the beginning of the input data. The shift-varying predicate function includes a containment property such that if the predicate function is true for a given value of input data in the sliding window at a first position, the predicate function will be true for the same value of input data at any sliding window position after the first position. Shift-varying segmentation can be used in compression, transaction acceleration, and data storage applications.

In an embodiment, the shift-varying predicate function computes a hash value from the input data in the sliding window. The hash value is compared to a threshold value. In an embodiment, the threshold value is determined from a threshold function. In one embodiment, if the threshold function is a non-decreasing function of the sliding window position, the predicate function outputs a true value if the hash is less than or equal to the threshold value. In another embodiment, if the threshold function is a non-increasing function of the sliding window position, the predicate function outputs a true value if the hash is greater than or equal to the threshold value.

In an embodiment, the threshold function has a value equal to the maximum possible hash value at the sliding window position corresponding with the maximum desired segment size.

In another embodiment, the hash value is modulo divided by a modulo operand before being compared with the threshold value. The modulo operand may vary as a function of the sliding window position.

BRIEF DESCRIPTION OF THE DRAWINGS

The invention will be described with reference to the drawings, in which.

DETAILED DESCRIPTION OF THE INVENTION

Some segmentation schemes are referred to as shift-invariant because the decision to create a segment boundary does not vary with the sliding window position but rather is based only on the data within the sliding segmentation window. An embodiment of the invention includes a shift-varying segmentation system and method in which segmentation boundaries are a function of the sliding window position and the data within the sliding window. In embodiments of the invention, the predicate function used to set segment boundaries will sometimes behave differently for the same input data, depending upon the location of the sliding window relative to the last segment boundary.

Figure 1:
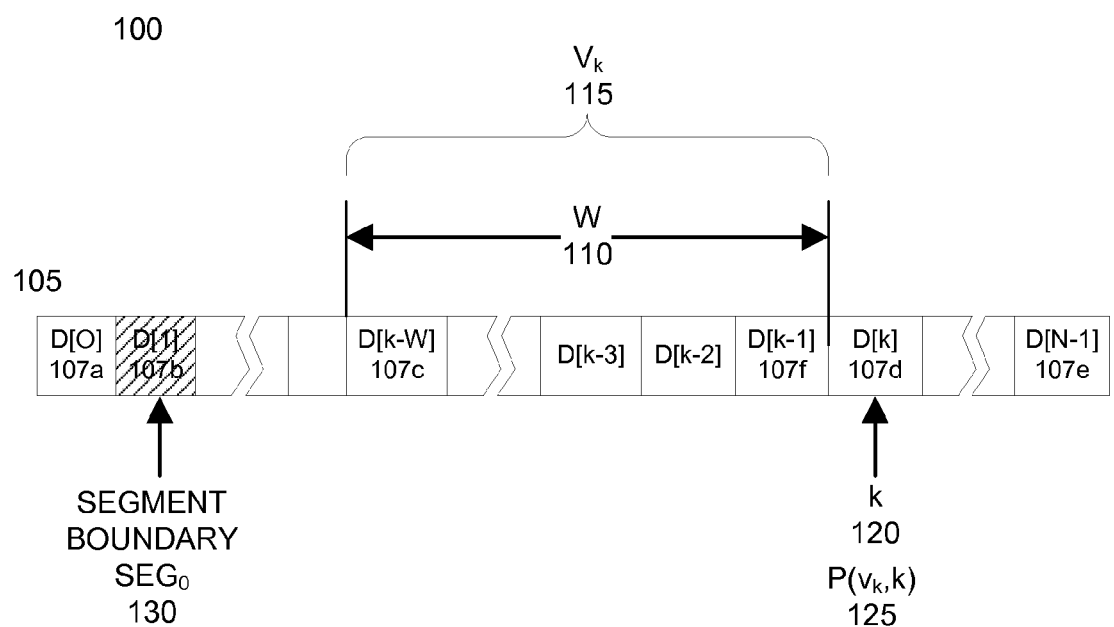
FIG. 1 illustrates an example application of a shift-varying predicate function according to an embodiment of the invention.

FIG. 1 illustrates an example application 100 of a shift-varying predicate function according to an embodiment of the invention. In example 100, a data buffer 105 includes input data 107 to be segmented. Data buffer 105 can include all or only a portion of the input data 107 to be segmented, with additional portions of data transferred into data buffer 105 as needed. In an embodiment, data buffer 105 is substantially larger than the typical segment size so as to minimize the number of data transfers to data buffer 105.

Input data 107 is comprised of a sequence of data units. For example, data buffer 105 is capable of storing N data units, where N is any arbitrary positive integer. In this example, the input data 107 is comprised of a sequence of data units from D[0] 107*a* to D[N−1] 107*e*, and include data units D[1] 107*b*, D[k−W] 107*c*, D[k−1] 107*f* and D[k] 107*d*. Embodiments of data units can include characters, bits, bytes, words, or any other unit of data known in the art. Embodiments of the data units can represent binary or text data in a file system; payload data to be communicated over a network; data fields, tables, or objects in a database; HTML, XML, or any other type of data or metadata tags; or data from any other type of application using data segmentation.

In an embodiment of the invention, a sliding window 110 is used to select a portion of the input data 107 in data buffer 115. The size of the sliding window is specified as W, where W is an arbitrary positive integer less than N and typically much less than N. The position of the sliding window 110 within the data buffer 105 is defined by index k 120, where k is an arbitrary integer and in an embodiment W≦k<N. In an embodiment, the value of k is the distance in the data buffer 105 from a previously defined segmentation boundary, if one has been defined, or from the beginning of the data buffer 105, if no previous segmentation boundaries have been defined.

In an embodiment, the location of sliding window 110 trails the index k 120. In this embodiment, the selected portion of the data, referred to as $v_k$ 115 is defined as the sequence of input data 107 from D[k−W] 107*c* up to and including D[k−1] 107*f*. In other embodiments, the sliding window 110 can be positioned ahead of index k 120, centered around index k 120, or in any other arbitrary position relative to index k 120. In these other embodiments, the range of k and the definition of $v_k$ 115 will vary accordingly.

Embodiments of the invention segment input data 107 in data buffer 105 using shift-varying segmentation. In an embodiment, a shift-varying predicate function $P(v_k, k)$ 125 evaluates the selected input data $v_k$ 115 and the index k 120. In an embodiment, the output of predicate function $P(v_k, k)$ 125 is a true or false decision value. If the output of predicate function $P(v_k, k)$ 125 is true, a segment boundary is defined at index k 120 in data buffer 105. Conversely, if predicate function $P(v_k, k)$ 125 is false, index k 120 is incremented, the sliding window 110 is moved accordingly, and a new $v_k$ 115 is defined.

Unlike prior segmentation schemes, the embodiment of the predicate function $P(v_k, k)$ 125 in example 100 depends on both the selected input data $v_k$ 115 and the position of the sliding window 110, which is specified by the value of index k 120. For example, predicate function $P(v_k, k)$ 125 can depend on the distance between index k 120 and a previous segmentation boundary $SEG_0$ 130.

Shift-varying segmentation often leads to better performance, in general, than shift-invariant segmentation. One such metric of performance comparison is the degree of duplicate segments that occur when segmenting a large corpus of data for the same average segment size. This can be computed by segmenting a corpus of data (e.g., a set of files in a file system or a set of TCP connection payload data from a network) and computing the ratio of the number of unique segments encountered divided by the total number of segments, for the two segmentation processes in question. The lower this "uniqueness ratio" the better the segmentation is because more candidates for duplicate data have been detected. It turns out that for a given average segment size, the shift-varying scheme described herein performs better on average for many practical workloads than the shift-invariant schemes in the prior art.

With prior shift-invariant segmentation schemes, the same data sequences are segmented the same way every time independent of surrounding data patterns. This advantage of prior shift-invariant segmentation schemes is outweighed by its problems in aligning segment boundaries with naturally occurring patterns in the underlying data. Input data typically does not have a uniform structure. As a result, the natural patterns of input data include recurring patterns in a variety of sizes, ranging from very small patterns to very large patterns. In general, it is unlikely for prior shift-invariant segmentation schemes to define segments that align with these naturally occurring patterns of varying sizes. For example, it is unlikely for a prior shift-invariant segmentation scheme to define a large segment that is aligned with a large underlying data pattern and define a small segment that is aligned with a small underlying data pattern, and so forth.

In contrast, shift-varying segmentation according to embodiments of the invention can create segment sizes that are distributed more uniformly. In a typical application of embodiments of the invention, segments are roughly the same size with variations to account for natural patterns in the input data.

To this end, embodiments of a shift-varying predicate function P are defined so that the following property holds. Let the set S={v:v is a W-data unit tuple}, i.e., the set S is the set of all possible values of input data within a window of size W in a data buffer.

Let $S_k=\{v:P(k, v)=1\}$ for $k=W \ldots M$, for some finite M. $S_k$ is the set of all values of input data within a sliding window at location k where the predicate function P evaluates as true. The location of the sliding window can range from W up to M. The length of a potential segment associated with $S_k$ for a given value of k is k.

With these definitions, an embodiment of the shift-varying predicate function P can be defined as any function of k and v such that $S_W$ is contained by $S_{W+1}$, which is contained by $S_{W+2}$, and so forth up to $S_{M-1}$ is contained by $S_M=S$.

By definition, $P(k, S)=P(k, S_M)=1$, because the shift-varying predicate function must evaluate as true (or 1) for at least one value of input data in a sliding window and S includes all of the possible values of input data for a sliding window. Thus, the length of segments potentially created by the shift-varying predicate function P range from W (where k=W) up to a maximum of M (where k=M). M then represents the maximum segment size induced by P.

In other words, the shift-varying predicate function P is chosen such that the number of different values of input data in the sliding window for which P=1 increases as the distance of the sliding window from the last segmentation boundary increases. Additionally, if the shift-varying predicate function P evaluates as true for a given value of input data in a sliding window at position k, then the shift-varying predicate function P will also evaluate as true for this same input data in a sliding window at any position greater than k.

This property of the shift-varying predicate function is referred to as the "containment property." The containment property of the shift-varying predicate function provides two benefits. First, increasing the set of P=1-valued outcomes with an increasing offset decreases the variance in the distribution of segment sizes compared to the geometric distribution, i.e., segment sizes tend to be more uniformly distributed about the mean. And second, strictly increasing the set of possible outcomes means that the segmentation process tends to synchronize the choice of segment boundaries for the same underlying data independent of the preceding context. This latter property is important in providing good performance in terms of the "uniqueness ratio" defined earlier.

As a result of this containment property, input data segmented according to embodiments of the invention using a shift-varying segmentation function tends to be segmented in the same way, despite the shift-varying nature of the predicate function, except at relatively brief transition points in the underlying data patterns. The shift-varying predicate function tends to synchronize itself with the underlying patterns of input data after these transition points in the input data.

Figure 2:
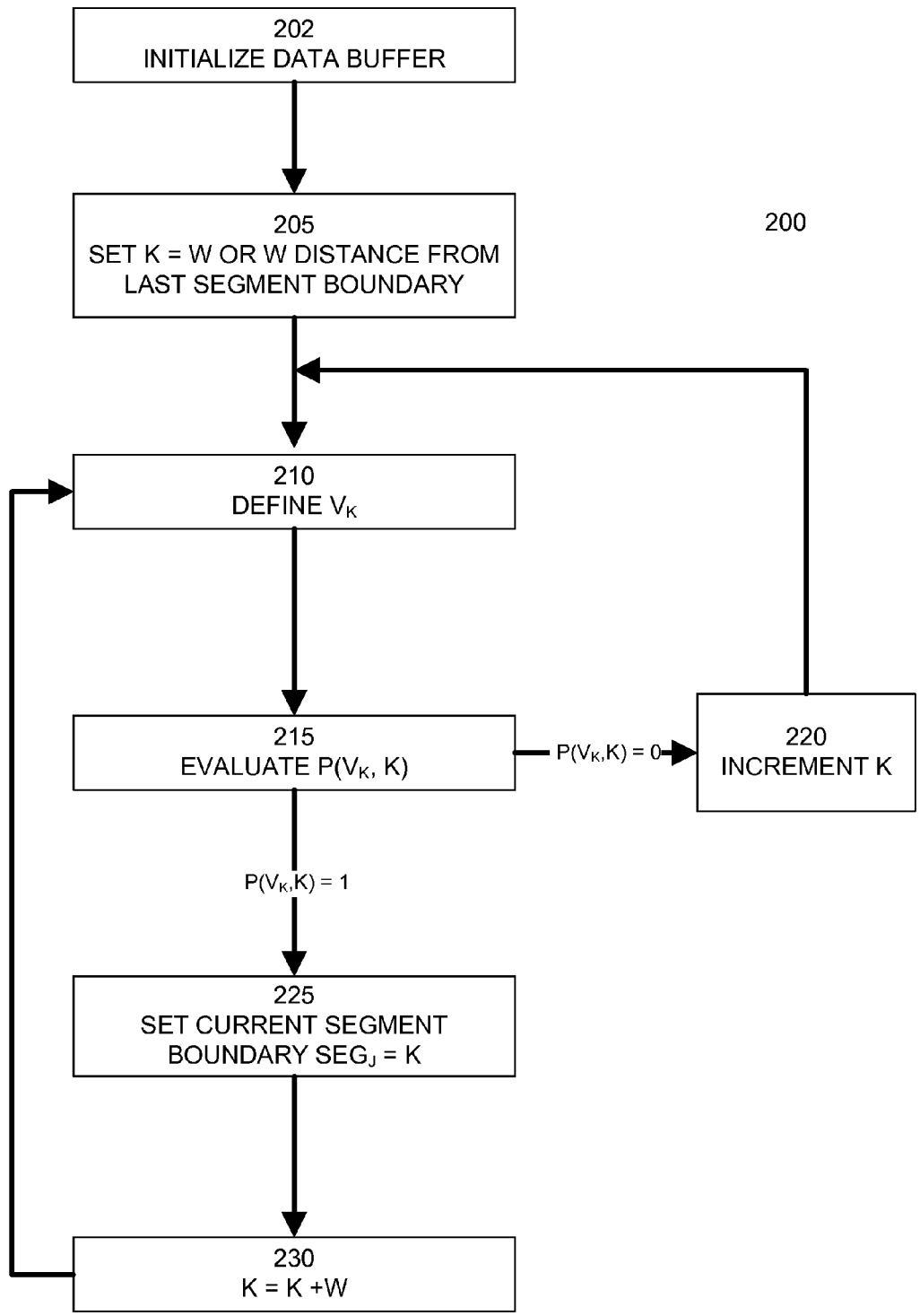
FIG. 2 illustrates a method of segmenting data according to an embodiment of the invention.

FIG. 2 illustrates a method 200 of segmenting data according to an embodiment of the invention. Step 202 initializes a data buffer with input data. After a data buffer has been initialized with input data, step 205 sets a variable K equal to the distance W from the previous segment boundary, if any has been defined, or from the beginning of the data buffer, where W is the width of the sliding window. Variable K defines the absolute position of the sliding window in the data buffer. In this embodiment, the sliding window is defined as the W data units preceding the data buffer location specified by variable K. In other embodiments, the sliding window can be defined at any position relative to variable K and step 205 initializes variable K to first position in the data buffer corresponding with a valid sliding window location.

Step 210 defines a set $v_k$ as the portion of the input data in the data buffer included within the sliding window at its current location as specified by the value of variable K. Step 215 evaluates the predicate function $P(v_k, K)$ for the current value of set $v_k$ and the current sliding window position K.

If the value of the predicate function $P(v_k, K)$ is false (e.g. $P(v_k, K)=0$), step 220 increments the variable K to specify a new position K' of the sliding window. Steps 210 and 215 are then repeated to define a new set $v_k'$ based on the new position K' of the sliding window and to evaluate the predicate function P for $v_k'$ and K'. In an embodiment, step 220 increments variable K by 1, so that the sliding window moves one position further away from the previous segment boundary or the beginning of the data buffer.

Conversely, if the value of the predicate function $P(v_k, K)$ is true (e.g. $P(v_k, K)=1$), step 225 sets the current segment boundary $SEG_j$ to the position specified by the value of variable K. In an embodiment, step 225 adds the current segment boundary $SEG_j$ to a list of segment boundaries previously determined. The list of segment boundaries can then be provided to other portions of the application to create segments from input data using these segment boundaries. In another embodiment, step 225 outputs the current segment boundary $SEG_j$ to another portion of the application to create a segment from the input data including $v_k$.

Step 230 increments the variable K by W, moving the sliding window W positions away from the previous position K in the data buffer. In others embodiments, after setting a segment boundary, the variable K does not need to advance by W and could simply continue to advance by one data unit at a time, allowing segments to be formed that are smaller than W data units. Alternatively, the offset could be advanced by more than W data units upon finding a segment boundary, causing the method 200 to segment data faster at a possible cost in the performance of the uniqueness ratio.

Following step 230, method 200 returns to step 210 to define a new set $v_k'$ based on the new position K' of the sliding window. Method 200 can be repeated until all of the input data in the input buffer has been processed or, in the case of a continuous data stream, as long as input data continues to arrive.

Figure 3:
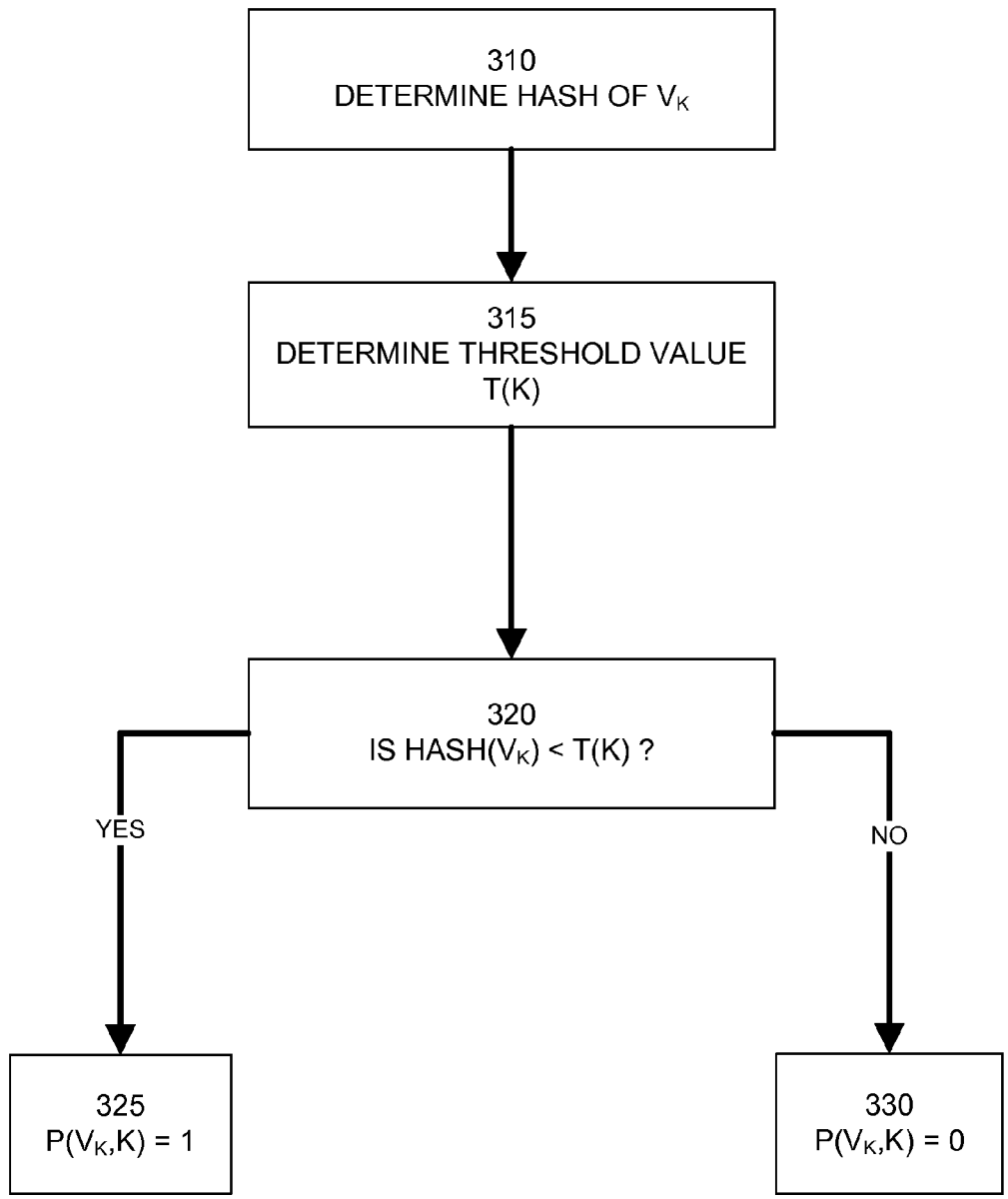
FIG. 3 illustrates a method of evaluating a predicate function according to an embodiment of the invention.

FIG. 3 illustrates a method 300 of evaluating a predicate function according to an embodiment of the invention. Step 310 determines a hash value of the input data $v_k$ in the current sliding window. The hash function used in step 310 can be any hash function known in the art. In an embodiment, the hash function is a rolling hash function in which a hash value for input data in a window at position k can be derived from a previously determined hash value in the window at position k−1. Typically, this derivation can be performed with minimal additional computation.

For example, if vk is defined as the set of data D[k−W] up to and including D[k−1], then a Rabin fingerprint (RF) hash function can be defined as:

$$RF(v_k)=RF(D[k-W], D[k-W+1], D[k-W+2], \ldots \\ D[k-2], D[k-1])=(D[k-W]p^W+D[k-W+1]p^{W-1}+ \\ D[k-W+2]p^{W-2}+\ldots+D[k-2]p+D[k-1]) \bmod M$$

Moreover, the hash function of $v_{k+1}$ can be determined from the hash function of $v_k$ as follows:

$$RF(v_{k+1})=RF(D[k-W+1], D[k-W+2], D[k-W+3], \ldots \\ D[k-1], D[k])=(D[k-W+1]p^W+D[k-W+2]p^{W-1}+ \\ D[k-W+3]p^{W-2}+\ldots+D[k-1]p+D[k]) \bmod M$$

Thus, $RF(v_{k+1})=((RF(v_k)-D[k-W]p^W)p+D[k]) \bmod M$. For faster execution, the quantity $D[k-W]p^W$ can be precomputed and stored in a table. Since p and W are constant, this table has a finite size. Rather than generating each hash of $v_k$ from scratch, generating $v_{k+1}$ requires only a subtraction of $D[k-W]p^W$, a multiplication by p, an addition of D[k], and a modulo operation, which can be a masking operation if M is a power of two. Thus, this embodiment of step 305 can determine the hash of input data $v_k$ from the hash of the previously considered input data $v_{k-1}$ and the value of the input data at buffer position k−1.

Typical hash functions output a hash value ranging from 0 up to a maximum hash value, referred to as Z. If the hash function outputs a 32-bit value, then $Z=2^{32}-1$. If the hash function outputs a 64-bit value, then $Z=2^{64}-1$. Thus, the hash value determined in step 305 ranges from 0 to Z.

Step 315 determines a threshold value for the current sliding window position k in the input buffer. In an embodiment, the threshold value varies as a function T(k) of the distance of the current sliding window position k from the previous segment boundary. As discussed above, embodiments of the predicate function should follow the containment property. To achieve this, the threshold function T(k) can be any non-decreasing function of k, whereby the shape of the threshold function T(k) controls the distribution of segment sizes. To limit the maximum segment size to M, the threshold function T(k) is further designed so that T(M−1)=Z.

Step 320 compares the hash of $v_k$ with the threshold function T(k). If one or more of these differences is less than the current threshold value T(k), then step 325 outputs a true value (e.g. 1) for the predicate function. Otherwise, if none of these differences are less than the current threshold value T(k), step 330 outputs a false value (e.g. 0) for the predicate function.

Because the threshold function T(k) is increasing as k increases in distance from the last segment boundary, the number of possible hash values less than T(k) increases as T(k) increases. Moreover, by setting T(M−1)=Z, which is the maximum possible hash value, the predicate function will evaluate as true for any of possible hash values when k=M, the maximum desired segment size.

In another embodiment of method 300, the inequality of step 320 can be reversed so that T(k) is a non-increasing function of k and the predicate function evaluates as true when the hash is greater than the threshold value.

Additionally, the threshold function allows the frequency with which the predicate function evaluates to 1 to be very precisely controlled. For example, consider a threshold value $T\_0=Z/100$. Since hash functions tend to create statistically random outputs, one would expect that a hash value would be less than or equal to $T_0$ approximately $(Z/100)/Z=1\%$ of the time. Likewise, if the threshold was chosen to be 0.103794 Z, then one would expect a hash value to be greater than approximately 10.3794% of the time. In this fashion, the probability of creating a segment boundary can be precisely controlled.

Additionally, embodiments of the threshold function vary the probability of the hash value being greater than T as the distance of the sliding window at position k from the last segment boundary increases. This can be done in many different ways. For example, the threshold function can set $T(k)=k\times Z/(M-1)$, i.e., so that $T(0)=0$ and $T(M-1)=Z$. In another example, the threshold function T(k) could "stair step" upward from an initially low probability threshold to progressively higher probability thresholds as k increases, e.g., $T(k)=Z/M\times 2^{-floor\{log\_2\{(M-k)/M\}\}}$.

In another embodiment, the threshold function T(k) could be pre-computed and stored in a lookup table. Since the table would need to be no larger than M entries, such an approach would admit an efficient implementation. Moreover, this approach would allow for an arbitrarily shaped threshold curve.

In another embodiment, the range of hash values can be reduced to simplify the implementation. One approach to reduce the range is to apply a modulo operator to the hash value. When the modulo operand is chosen to be a power of two, this can be simply implemented by choosing some number of bits from the hash value's binary representation. For example, if the modulo operand is $32(2^5)$, then only the last five bits In turn, the range is no longer 0 . . . Z but is 0 . . . Z' where Z'+1 is the modulo operand of the hash value transformation. In this case, all of the discussion above applies to the new model in which Z' replaces Z.

In still another embodiment, the range of hash values can be reduced by a modulus operator that is also shift varying. In this approach, the predicate function $P(v_k, k)$ is computed as according to the pseudocode of Table 1.

TABLE 1

Define $v_k = (D[k-W], D[k-W+1], ..., D[k-1])$ for k >= W
Let $H(v_k)$ be a hash of the data units in $v_k$
Let R(k) be a function of k defining a modulo operand value to be applied to the hash value that obeys the containment property
Let c be a constant
Then, $P(k, v_k) = 1$ if $H(v_k)$ mod $R(k) = c$, and 0 otherwise In this embodiment, the function R(k) must be chosen carefully so as to retain the containment property. One example approach that follows the containment property is:

$$R(k)=2^{-floor\{log2\{(M-k)/M\}\}}$$

In another embodiment, a shift-varying modulus can be combined with a shift-varying threshold. In this approach, the predicate function $P(v_k, k)$ is computed as according to the pseudocode of Table 2.

TABLE 2

Define $v_k = (D[k-W], D[k-W+1], ..., D[k-1])$ for k >= W
Let $H(v_k)$ be a hash of the data units in $v_k$
Let T(k) be a function of k defining a threshold value
Let R(k) be a function of k defining a modulo value to be applied to the hash value that obeys the containment property
Let c be a constant
Then, $P(k, v_k) = 1$ if $H(v_k)$ mod $R(k) <= T(k)$, and 0 otherwise There are many uses for shift-varying segmentation, including systems for protocol acceleration over a communication network, systems for compressing network packets, and storage systems that eliminate data redundancy. In general, embodiments of the shift-varying segmentation described herein can be used in any application requiring data segmentation.

Figure 4:
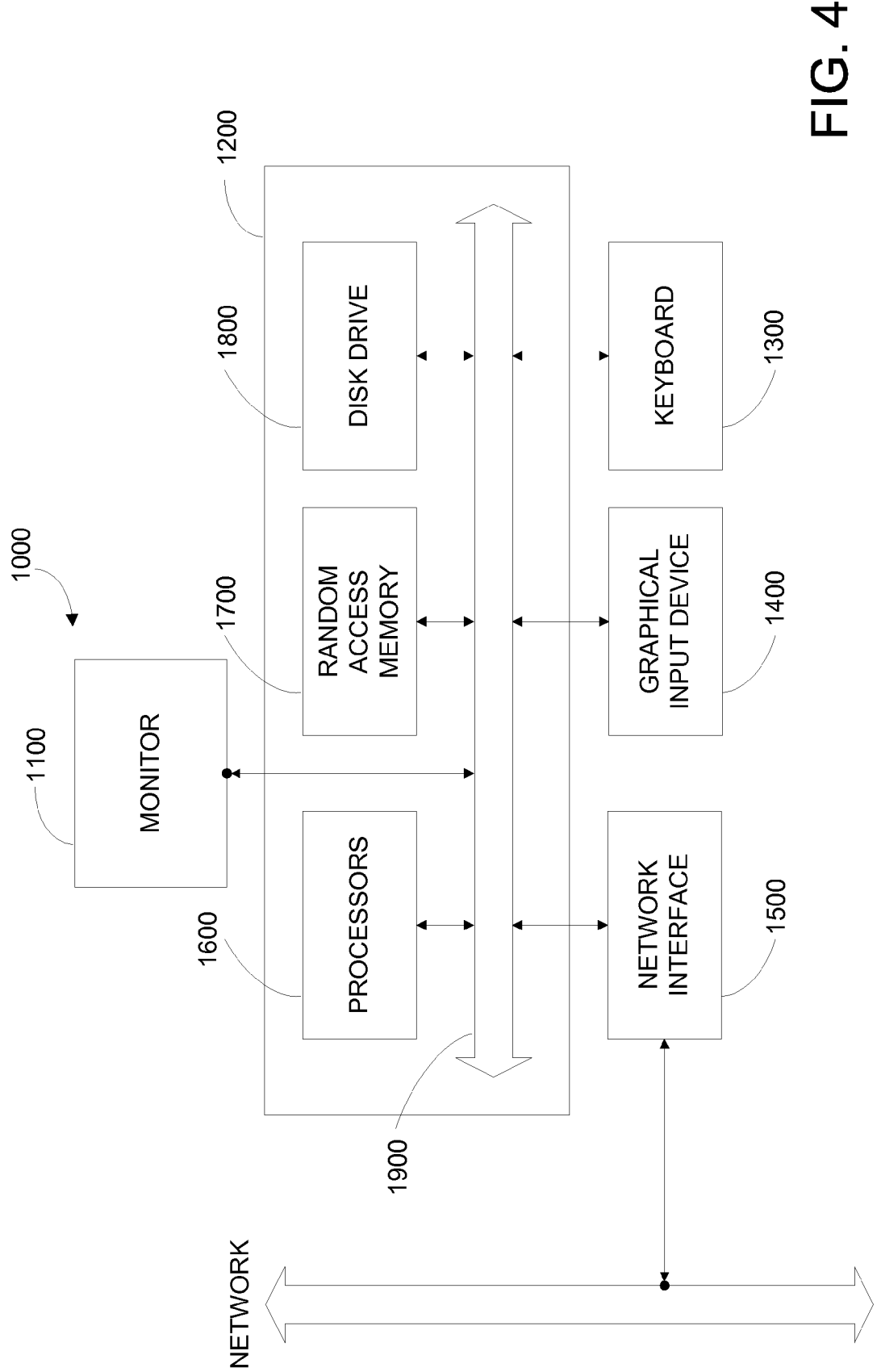
FIG. 4 illustrates a computer system suitable for implementing embodiments of the invention.

FIG. 4 illustrates a computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN). Further embodiments of the invention can be implemented with a computer system in an appliance form factor configured for unattended operation, in which input and output devices have been removed or simplified and user interaction is performed primarily through a network interface.

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 5:
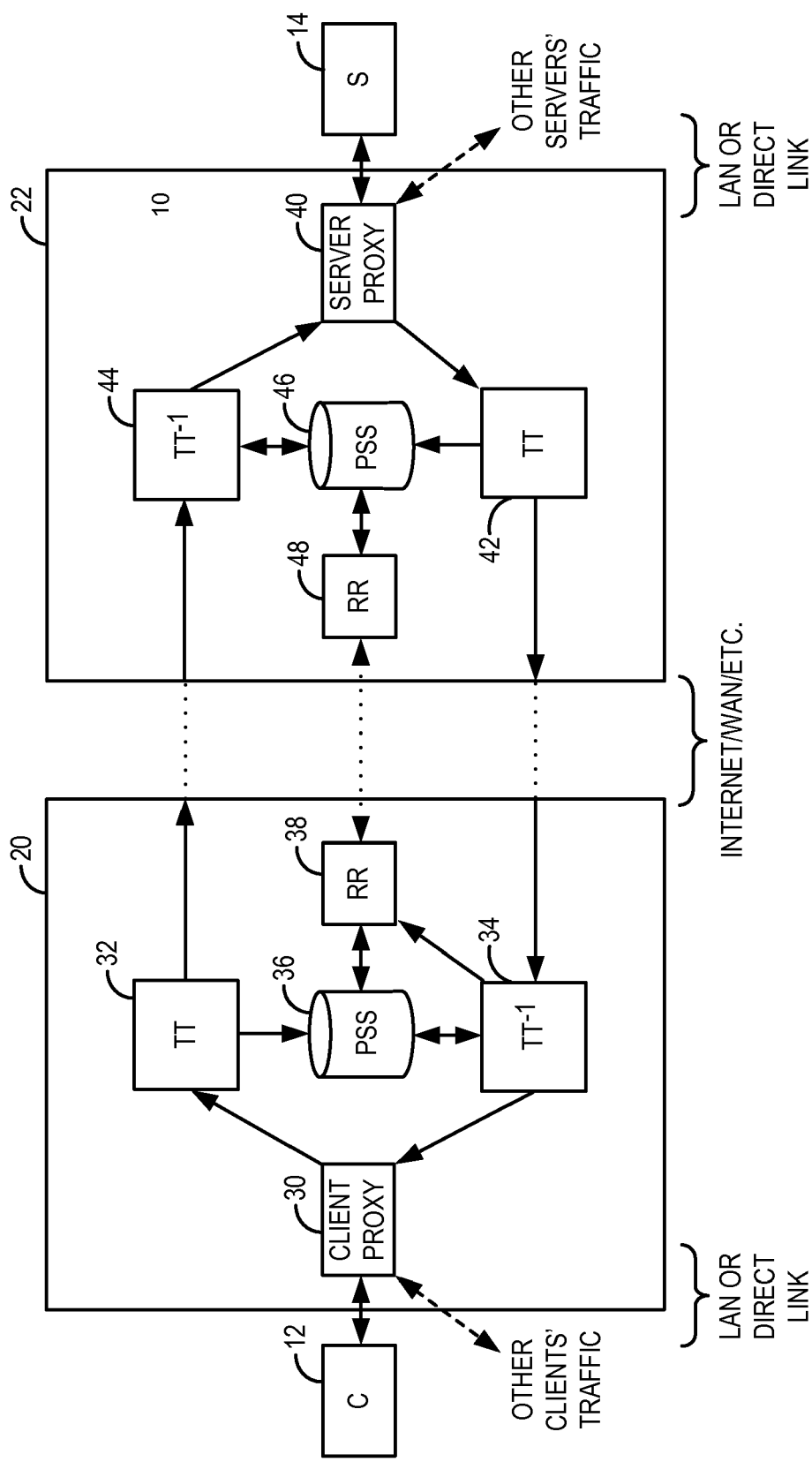
FIG. 5 illustrates a transaction acceleration system suitable for use with embodiments of the invention.

FIG. 5 illustrates a network transaction acceleration system 10 utilizing shift-varying segmentation according to an embodiment of the invention. While system 10 only shows one client and one server are shown, it should be understood that the system 10 can include additional clients, servers, databases, and other entities. For example, a client transaction accelerator 20 might be handling transactions from more than one client and server transaction accelerator 22 might be handling transactions with more than one server. As illustrated there in FIG. 5, client 12 is coupled to a client proxy 30 of client transaction accelerator 20.

While other forms of multiplexing and de-multiplexing traffic to and from clients could be used, in this example, a client proxy is used to receive data for client transaction accelerator 20 from one or more clients and to send data for the client transaction accelerator 20 to the one or more clients. The other elements of client transaction accelerator 20 shown in FIG. 5 include a transaction transformer (TT) 32, an inverse transaction transformer ($TT^{-1}$) 34, a persistent segment store (PSS) 36 and a reference resolver (RR) 38. Server 14 is coupled to a server proxy 40 of server transaction accelerator 22, which is shown including elements similar to those of client transaction accelerator 20, such as a transaction transformer (TT) 42, an inverse transaction transformer ($TT^{-1}$) 44, a persistent segment store (PSS) 46 and a reference resolver (RR) 48. The transaction transformer (TT) is adapted to convert input data into a set of segments and references thereto. The inverse transaction transformer is adapted to convert a set of segments and references thereto into a reconstruction of the input data. The persistent segment store is adapted to store input data corresponding to the set of segments. The reference resolver is adapted to identify the segments in the persistent segment store corresponding to segment references.

Client 12 is coupled to client proxy 30, which is coupled to TT 32 and $TT^{-1}$ 34. TT 32 is coupled to PSS 36 and to the network between client transaction accelerator 20 and server transaction accelerator 22. $TT^{-1}$ 34 is coupled to PSS 36, client proxy 30, RR 38 and to the network between client transaction accelerator 20 and server transaction accelerator 22. RR 38, as shown, is also coupled to PSS 36 and to the network between client transaction accelerator 20 and server transaction accelerator 22.

On the other side of the figure, server 14 is coupled to server proxy 40, which is coupled to TT 42 and $TT^{-1}$ 44. TT 42 is coupled to PSS 46 and to the network between server transaction accelerator 22 and client transaction accelerator 20. $TT^{-1}$ 44 is coupled to PSS 46, server proxy 40, RR 48 and to the network between server transaction accelerator 22 and client transaction accelerator 20. RR 48, as shown, is also coupled to PSS 46 and to the network between server transaction accelerator 22 and client transaction accelerator 20.

The PSS can be a disk subsystem, a memory subsystem, or portions thereof. The PSS can also be a memory subsystem with disk backing store, a database server, a database, etc.

In operation, the client and server transaction accelerators examine the payloads of their transactions where warranted and store/cache strings or other sequences of data ("segments") derived from those payloads using a globally unique naming scheme that can be independent of the transaction. In an embodiment, shift-varying segmentation as discussed above can be used to segment data. When sending the payload from one transaction accelerator to another, the transaction accelerator may replace the segment data with references to the segment data. In some cases segmentation and substitution will not be performed where acceleration is not expected, such as where the amount of data involved is small. The segmented portions of the transaction can be any portion of the data sent, so long as the transaction is still identifiable at the receiving end enough to be reconstructed.

For example, where a client initiates a number of file request transactions, if the files have data in common, that common data might be formed as a segment and after the first such segment is transmitted, all further requests for files with the common data would have a segment reference substituted for the common data, to be replaced by the client transaction accelerator before sending the reconstructed file to the client making the request. Similarly, where one client transaction accelerator handles more than one client, the segments for one client can be used for another client.

Where the transactions are other than file transactions, analogous acceleration is possible. For example, where a client transaction accelerator is coupled to an e-mail client and an server transaction accelerator is coupled to an e-mail server, an e-mail attachment that many clients are requesting via the client transaction accelerator can be represented as a segment after the client transaction accelerator has obtained the contents of the attachment and then each subsequent time a client requests the attachment, the responding server transaction accelerator will replace the attachment with the segment reference and the receiving client transaction accelerator will replace the reference with the stored attachment. Since the attachment is stored as a segment independent of the transaction, the same segment data might be found in a file transaction, additional e-mail transactions or other transactions, and in each case, the sender replaces the data with the segment reference and the receiver replaces the segment reference with the segment data.

Similarly, shift-varying segmentation is also applicable to the management of database BLOB (binary large object) and CLOB (character large object) data. In this embodiment, shift-varying segmentation is applied to database BLOBs and CLOBs and segments or references to segments are stored in place of the unprocessed database BLOB and CLOB data. Deduplication of BLOB and CLOB data would reduce database storage requirements and provide related performance improvements.

In other embodiments, shift-varying segmentation is applicable to other types of structured data, such as compressing XML serializations of database tables and accelerating XML-based communication and remote procedure call protocols such as SOAP.

Further embodiments can be envisioned to one of ordinary skill in the art after reading the attached documents. In other embodiments, combinations or sub-combinations of the above disclosed invention can be advantageously made. For example, all or portions of the shift-varying segmentation system may be integrated into hardware or software of networking devices, such as a router, switch, proxy, or gateway. The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of segmenting data for data processing, the method comprising:
   initializing a data buffer including input data;
   specifying a first value of a sliding window position in the data buffer;
   selecting a portion of the input data corresponding with the sliding window;
   determining, with a computing device, if the sliding window position is to be used as a segment boundary based on the selected portion of the input data and the first value of the sliding window position;
   setting the segment boundary at the first value of the sliding window in response to the determination that the sliding window position is to be used as the segment boundary; and
   specifying a second value of the sliding window position in response to the determination that the sliding window position is not to be used as the segment boundary.

2. The method of claim 1, wherein the first value of the sliding window position corresponds with a first potential segment size and the second value of the sliding window corresponds with a second potential segment size, and wherein the second potential segment size is greater than the first potential segment size.

3. The method of claim 2, wherein a probability of the first value of the sliding window position being set as the segment boundary is less than or equal to a probability of the second value of the sliding window position being set as the segment boundary.

4. The method of claim 2, wherein the first potential segment size is measured from a previous segment boundary to the first value of the sliding window position and the second potential segment size is measured from the previous segment boundary to the second value of the sliding window position.

5. The method of claim 2, wherein the first potential segment size is measured from a beginning of the input buffer to the first value of the sliding window position and the second potential segment size is measured from the beginning of the input buffer to the second value of the sliding window position.

6. The method of claim 1, wherein determining if the sliding window be is to be used as the segment boundary comprises:
   determining a hash of the selected portion of the input data;
   comparing the hash with a threshold value specified by a threshold function, wherein the threshold function is a function of the sliding window position;
   specifying that the sliding window position is to be used as the segment boundary in response to the comparison satisfying a condition; and
   specifying that the sliding window position is not to be used as the segment boundary in response to the comparison not satisfying the condition.

7. The method of claim 6, wherein the condition is that the hash is less than or equal to the threshold value and wherein the threshold function is a non-decreasing function of the sliding window position.

8. The method of claim 6, wherein the condition is that the hash is greater than or equal to the threshold value and wherein the threshold function is a non-increasing function of the sliding window position.

9. The method of claim 6, wherein the hash is determined using a rolling hash function.

10. The method of claim 6, wherein at least a portion of the threshold function is defined using a lookup table.

11. The method of claim 6, wherein at least a portion of the threshold function is defined using a stair-step function.

12. The method of claim 6, wherein the threshold function has a threshold value equal to a maximum possible value of the hash when the sliding window position corresponds with a maximum segment size.

13. The method of claim 6, wherein comparing the hash with the threshold value comprises performing a modulo operation on the hash value.

14. The method of claim 13, wherein the operand of the modulo operation is a function of the sliding window position.

15. The method of claim 13, wherein the operand of the modulo operation is a constant.

16. The method of claim 1, wherein determining if the sliding window position is to be used as a segment boundary includes a containment property, such that if it is determined that the sliding window position should be the segment boundary for the selected portion of the input data and the first value of the sliding window position, it will also be determined that the sliding window position should be the segment boundary for another portion of the input data identical to the portion of the input data and any other value of the sliding window position greater than the first value of the sliding window position.

17. The method of claim 1, further comprising:
   providing the segment boundary to a data compression module including logic adapted to represent the input data as a set of segments and references thereto.

18. The method of claim 1, further comprising:
   providing the segment boundary to a communications acceleration module including logic adapted to communicate the input data to a second communications acceleration module as a set of segments and references thereto, such that the second communications acceleration module creates a reconstructed version of the input data.

19. The method of claim 1, wherein the second value of the sliding window position is one data unit greater than the first value of the sliding window position.

20. The method of claim 1, wherein the second value of the sliding window position is at least two data units greater than the first value of the sliding window position.

21. The method of claim 1, wherein initializing the data buffer comprises:
   receiving at least a portion of a stream of input data and storing the portion of the stream of input data in the data buffer.

22. The method of claim 1, wherein initializing the data buffer comprises: receiving at least a portion of a data file of input data and storing the portion of the data file of input data in the data buffer.

23. The method of claim 1, wherein the input data is binary data.

24. The method of claim 1, wherein the input data is character data.

25. The method of claim 1, wherein the input data is payload data for at least one network packet.

26. The method of claim 1, wherein the input data is a database object.

27. The method of claim 1, wherein the input data is Extensible Markup Language (XML) data.

28. The method of claim 1, wherein the input data is a database object.

29. A computer readable storage medium including instructions adapted to direct a computer to perform an operation, the operation comprising:
- initializing a data buffer including input data;
- specifying a first value of a sliding window position in the data buffer;
- selecting a portion of the input data corresponding with the sliding window;
- determining if the sliding window position is to be used as a segment boundary based on the selected portion of the input data and the first value of the sliding window position;
- setting the segment boundary at the first value of the sliding window in response to the determination that the sliding window position is to be used as the segment boundary; and
- specifying a second value of the sliding window position in response to the determination that the sliding window position is not to be used as the segment boundary.

30. The computer readable storage medium of claim 29, wherein the first value of the sliding window position corresponds with a first potential segment size and the second value of the sliding window corresponds with a second potential segment size, and wherein the second potential segment size is greater than the first potential segment size.

31. The computer readable storage medium of claim 30, wherein a probability of the first value of the sliding window position being set as the segment boundary is less than or equal to a probability of the second value of the sliding window position being set as the segment boundary.

32. The computer readable storage medium of claim 30, wherein the first potential segment size is measured from a previous segment boundary to the first value of the sliding window position and the second potential segment size is measured from the previous segment boundary to the second value of the sliding window position.

33. The computer readable storage medium of claim 30, wherein the first potential segment size is measured from a beginning of the input buffer to the first value of the sliding window position and the second potential segment size is measured from the beginning of the input buffer to the second value of the sliding window position.

34. The computer readable storage medium of claim 29, wherein determining if the sliding window is to be used as the segment boundary comprises:
- determining a hash of the selected portion of the input data;
- comparing the hash with a threshold value specified by a threshold function, wherein the threshold function is a function of the sliding window position;
- specifying that the sliding window position is to be used as the segment boundary in response to the comparison satisfying a condition; and
- specifying that the sliding window position is not to be used as the segment boundary in response to the comparison not satisfying the condition.

35. The computer readable storage medium of claim 34, wherein the condition is that the hash is less than or equal to the threshold value and wherein the threshold function is a non-decreasing function of the sliding window position.

36. The computer readable storage medium of claim 34, wherein the condition is that the hash is greater than or equal to the threshold value and wherein the threshold function is a non-increasing function of the sliding window position.

37. The computer readable storage medium of claim 34, wherein the hash is determined using a rolling hash function.

38. The computer readable storage medium of claim 34, wherein at least a portion of the threshold function is defined using a lookup table.

39. The computer readable storage medium of claim 34, wherein at least a portion of the threshold function is defined using a stair-step function.

40. The computer readable storage medium of claim 34, wherein the threshold function has a threshold value equal to a maximum possible value of the hash when the sliding window position corresponds with a maximum segment size.

41. The computer readable storage medium of claim 34, wherein comparing the hash with the threshold value comprises performing a modulo operation on the hash value.

42. The computer readable storage medium of claim 41, wherein the operand of the modulo operation is a function of the sliding window position.

43. The computer readable storage medium of claim 41, wherein the operand of the modulo operation is a constant.

44. The computer readable storage medium of claim 29, wherein determining if the sliding window position is to be used as a segment boundary includes a containment property, such that if it is determined that the sliding window position is to be used as the segment boundary for the selected portion of the input data and the first value of the sliding window position, it will also be determined that the sliding window position is to be used as the segment boundary for another portion of the input data identical to the portion of the input data and any other value of the sliding window position greater than the first value of the sliding window position.

45. The computer readable storage medium of claim 29, further comprising:
- providing the segment boundary to a data compression module including logic adapted to represent the input data as a set of segments and references thereto.

46. The computer readable storage medium of claim 29, further comprising:
- providing the segment boundary to a communications acceleration module including logic adapted to communicate the input data to a second communications acceleration module as a set of segments and references thereto, such that the second communications acceleration module creates a reconstructed version of the input data.

47. The computer readable storage medium of claim 29, wherein the second value of the sliding window position is one data unit greater than the first value of the sliding window position.

48. The computer readable storage medium of claim 29, wherein the second value of the sliding window position is at least two data units greater than the first value of the sliding window position.

49. The computer readable storage medium of claim 29, wherein initializing the data buffer comprises:
- receiving at least a portion of a stream of input data and storing the portion of the stream of input data in the data buffer.

50. The computer readable storage medium of claim 29, wherein initializing the data buffer comprises: receiving at least a portion of a data file of input data and storing the portion of the data file of input data in the data buffer.

51. The computer readable storage medium of claim 29, wherein the input data is binary data.

52. The computer readable storage medium of claim 29, wherein the input data is character data.

53. The computer readable storage medium of claim 29, wherein the input data is payload data for at least one network packet.

54. The computer readable storage medium of claim 29, wherein the input data is a database object.

55. The computer readable storage medium of claim 29, wherein the input data is Extensible Markup Language (XML) data.

56. The computer readable storage medium of claim 29, wherein the input data is a database object.

* * * * *